Jan. 30, 1951 A. W. MORRILL 2,539,633
DEVICE FOR BREEDING INSECTS
Filed Sept. 11, 1946
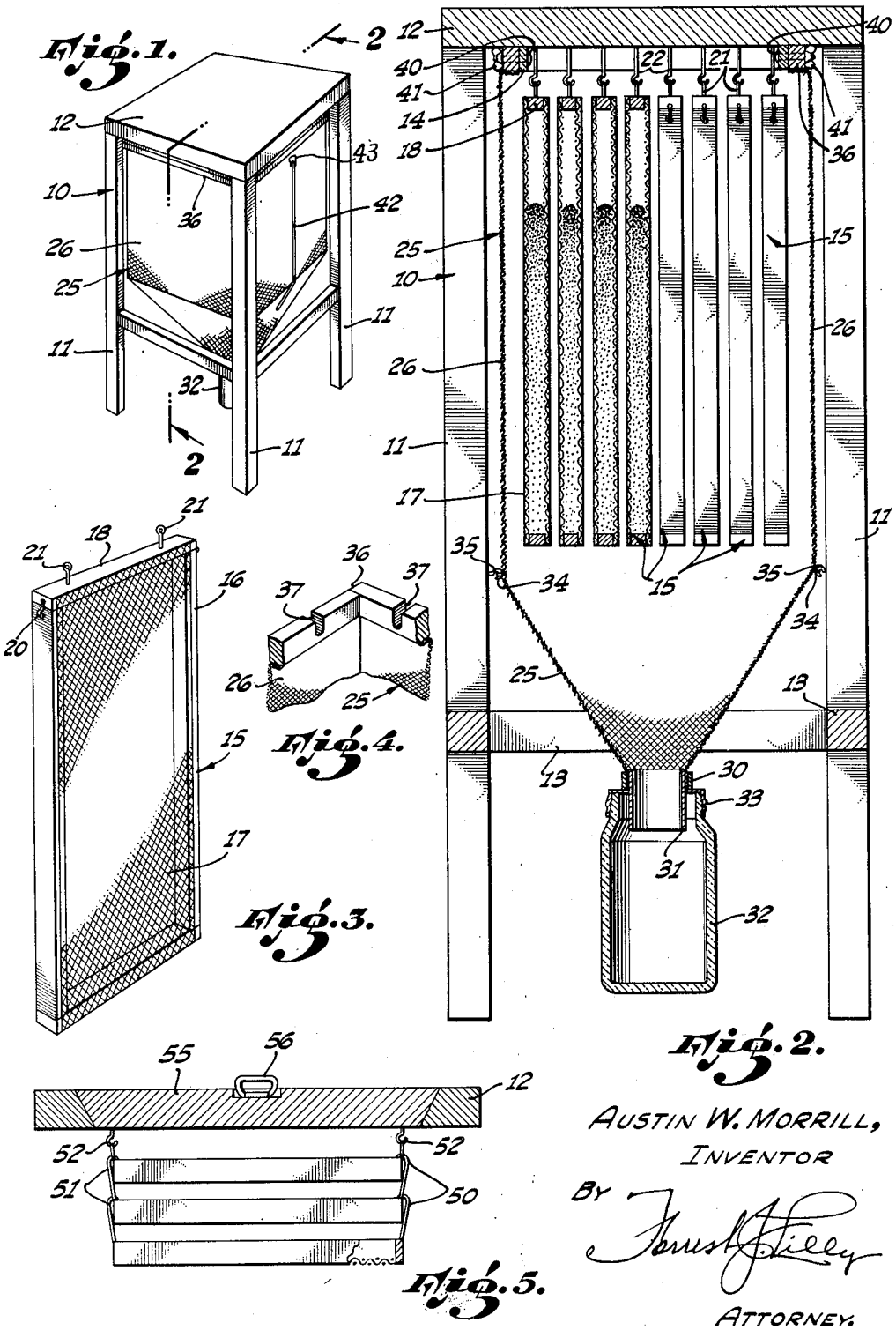
Austin W. Morrill,
Inventor
By
Attorney.

Patented Jan. 30, 1951

2,539,633

UNITED STATES PATENT OFFICE 2,539,633

DEVICE FOR BREEDING INSECTS

Austin W. Morrill, Glendale, Calif.

Application September 11, 1946, Serial No. 696,226

6 Claims. (Cl. 119—1)

This invention relates generally to the breeding of insects and more particularly to a breeding device which is adapted to accommodate a large number of insects in a relatively small space.

While insects are often considered one of man's enemies, there are many species which are quite useful in controlling other species. In many instances injurious insects are raised in the laboratory either as host insects, or food for beneficial species which are then made available in large numbers for the control of pests in the field and orchard. In addition, the eggs of some species are quite valuable as food for fish. Large quantities of insects are raised each year for these and other purposes. Commercial establishments and research institutions are the principal breeders of insects, and large capacity breeding devices have been developed for their use where great numbers of a given type of insect are to be raised. However, where a much smaller number of insects are to be raised, as may be the case where an aquarium owner wishes to maintain a small continuous production of insect eggs as a food for his fishes, or where a comparatively small quantity of certain types of insects is to be raised for experimental purposes, the large breeding devices are too expensive and inefficient and occupy too much space to meet the practical need. When insects of the moth sub-order are produced in mass, an objectionable type of dust, consisting of fine hairs and wing scales, is given off. This contaminates the air in the vicinity of the breeding cage or device making it necessary for the operator to wear a respirator as protection against throat irritation and asthma. The dust also is objectionable as such when it settles on other objects.

It is therefore the major object of this invention to provide an insect breeding device intended to be used in the breeding of relatively small quantities of a particular species of insect in a manner that is economical and in the case of moths, free from the dust hazard. Large scale production may be obtained by employing a sufficient number of the small units.

Another object of the invention is to provide a device of this type which will be relatively inexpensive to build, and which may be constructed of readily available materials.

It is a further object of the invention to provide a breeding device which is quite compact and relatively light in weight, thus providing a relatively portable device.

A further object of this invention is to provide an insect breeding device which is simple in construction and operation and may be used with good results by relatively inexperienced operators who have had only a minimum of training.

These and other objects and advantages of the invention will become apparent from the following description of a preferred and modified form thereof, and from the drawings illustrating those forms, in which:

Figure 1 is a perspective view of the improved insect breeding device;

Figure 2 is a vertical sectional view taken at 2—2 in Figure 1;

Figure 3 is a perspective view of one of the breeding trays used in the preferred form of the device;

Figure 4 is a perspective view of a portion of the upper part of the enclosing bag, indicating a preferred method of attaching the bag to the frame; and Figure 5 is a cross-sectional view of the upper portion of the frame of a modified form of the device.

Referring now to the drawings and particularly to Figure 1 thereof, the numeral 10 indicates generally a frame which is preferably made of wood and of such a size that it may be used as a stool or small table. In the form shown, the frame 10 includes four vertical legs 11 which support a horizontal top or seat portion 12 at their upper ends. Horizontal braces 13 connect the lower portions of the legs 11 together, and the braces are connected so that the central portion of the frame is unobstructed, while the required rigidity is provided for the structure.

In the preferred form of the device shown in Figures 1 and 2, the top 12 is provided with a depending flange 14 in the center, spaced inwardly from the legs 11 so that a container may be attached thereto in a manner hereinafter described.

In the breeding of insects, it is necessary to have a food supply for the insects which is similar to their natural food supply, and which is maintained within the proper ranges of temperature and humidity. Many insects feed on grain, and an example of such an insect is the grain moth, *Sitotroga cerealella*, the eggs of which are useful in the production of a beneficial egg parasite, *Trichogramma minutum*. These moths and their parasites are provided with a grain food, and while it may be desired to breed other types of insects, this device is intended primarily for the breeding of insects which may be raised on a grain food.

The mass of grain in which the insects breed must not be too great, since it is important that the moths, when they emerge from the kernels, be able to make their way through the whole grain to the surface of the food. For best results, the grain should be so held that it is not more than approximately one-half inch thick; and to meet these requirements, special containers for the grain have been devised. As shown in Figure 3, the containers comprise a lightweight wood or metal frame having vertical side members and a lower cross member formed in the shape of a U. Wire screening or hardware cloth 17 is tacked or otherwise held to the frame 16 to extend between the side members and from the lower cross member to the upper ends of the side members. By covering both sides of the frame 16 with a screening 17 of ten or twelve mesh, a container is formed which will retain the kernels of grain, while permitting the insects to pass through the screen after they have emerged from the kernels. To close the container 15, a small strip of wood or metal 18, similar to the lower cross piece of the frame 16, is held to the frame by hooks 20 or other suitable means. In this way, the grain within the container 15 is held so that it will not be spilled from the container no matter how the latter is turned, but the insects will be able to escape from the grain at all times.

To support the container 15 within the insect breeder, eyes 21 are mounted in the upper cross piece 18, and cooperating hooks 22 are mounted in the lower surface of the top 12. The hooks 22 should be arranged so that a space of approximately one-half inch is left between adjacent containers 15, and a space of from one to two inches should be left between the top of the container and the lower surface of the top 12. By making the containers 15 approximately eight inches wide, it is possible to suspend eight of them in this fashion in a frame 10 which is approximately twelve inches square in plan. As will be hereinafter shown, this method of suspension makes it possible to remove individual containers without disturbing any of the others when it is desired to replenish the grain, or for any other reason.

To contain the insects within the frame 10, a flexible porous enclosure 25, preferably of fabric, and having the characteristic that it is porous to air, but will not pass insects, is removably attached to the under surface of the top 12 and extends downwardly therefrom to a point below the bottom of the containers 15. As seen in Figures 1 and 2, the enclosure 25 has substantially vertical sides 26 which surround the containers 15, and which are preferably parallel to the edges of the top 12. In this way, the sides 26 may be maintained the proper distance from the containers 15, while the space within the frame 10 is utilized most efficiently.

At a point below the lower ends of the containers 15, the sides of the enclosure 25 are caused to converge toward a clamping ring 30 of relatively small diameter. The lower portion of the enclosure 25 is thus generally pyramidal in shape, with the sides of the pyramid preferably formed at an angle of approximately thirty degrees to the vertical.

At the apex of the pyramidal section of the enclosure 25, the clamping ring 30 holds the fabric forming the enclosure to a hollow cylindrical member 31. The member 31 and the pyramidal section of the enclosure 25 thus cooperate to form a funnel-like construction beneath the food containers 15; and the member 31 is adapted to be held in a removable container 32, such as a glass jar of the type used in home canning and preserving. The preferred method of securing the cylinder 31 to the jar 32 is by attaching a screwthreaded ring 33, such as is often used in conjunction with jars of this general type, to the cylinder 31 so that the latter extends through the threaded ring to which it is permanently attached, and downwardly into the jar. One of the characteristics of many insects, particularly *Sitotroga cerealella*, is that they generally do not climb or crawl downwardly; and this fact is used to retain the insects within the jar 32 by extending the cylinder 31 into the jar so that any insect which crawls up the wall of the latter would have to crawl down the outside of the cylinder before reaching the bottom thereof.

The cylinder 31 extends above the ring 33, and the enclosure 25 is slipped over the cylinder and held to it by the clamping ring 30. If desired, the enclosure 25 may be cemented to the cylinder 31 and the clamping ring 30 eliminated, adhesive tape may be tightly banded around the cylinder and enclosure, or any other suitable method of attachment may be used. However, no pocket should be permitted to form between the interior of enclosure 25 and the cylinder 31; and to insure that no folds form in the enclosure, the latter is preferably formed so that the jar 32 is supported thereby a slight distance above the floor on which the legs 11 rest. Under these conditions, the natural tendency of the enclosure 25 is to hang so that its sides form straight lines from the points of attachment to the top 12, to the cylinder 31. Such a condition would force the containers 15 together so that insufficient spacing resulted, and folds would be formed in the enclosure 25 which would prevent the proper operation of the device.

To overcome these difficulties, the enclosure 25 is provided with rings or loops 34 at the lower end of the vertical sides 26, alined with the legs 11; and hooks 35 are mounted in the legs to engage the loops and hold the enclosure 25 to its proper shape.

As previously mentioned, the upper end of the enclosure 25 is removably attached to the top 12 so that the enclosure may be removed for cleaning, repair of the frame, or other reasons. One of the most convenient methods of attaching the enclosure 25 to the top 12 is to provide the upper end of the enclosure with a wooden or metal frame 36 adapted to fit snugly around the depending flange 14 of the top, and provided with vertically extending slots 37. The slots 37 are clearly shown in Fig. 4, and they are spaced to fit around studs 40 extending horizontally outward from the flange 14. Wing nuts 41 are mounted on the ends of the studs 40, and may be tightened to clamp the frame 36 against the flange 14 to provide an insectproof seal. The upper end of the enclosure 25 is tacked, cemented, or otherwise securely fastened to the frame 36 so that adequate support is provided for the enclosure.

While it is not essential where the enclosure 25 is removably attached to the top 12, as shown here, it is generally preferable to furnish some means of obtaining access to the interior of the enclosure without removing the latter from the top and thus giving the insects the maximum opportunity to escape. Since the insects which are being raised in this device are relatively small, it is important that any access means be capable of being tightly closed when not in use. It has been found that the so-called hookless or slide fastener meets these requirements very satisfactorily, and consequently a slit 42 is formed on one of the vertical sides 26 of the enclosure 25 and is closed by a slide fastener indicated at 43. The slit 42 preferably extends from a point just below the frame 36, into the pyramidal section of the enclosure 25. If, for any reason, it is impractical or undesirable to use a slide fastener, the slit 42 may be closed by applying a pressure-tight tape, such as adhesive tape, to the sides of the slit and pressing it against a board or stiffening member which has been inserted in the enclosure and which may be removed through the cylinder 31 when the sealing has been completed.

Under certain conditions, it may be undesirable to use the vertically suspended containers 15 to hold the grain for the insects; and where this is the case, the optional form of food holder shown in Figure 5 may be used. As shown therein, the food holders comprise a series of horizontally mounted trays 50 having an open top and a solid or screen bottom. The trays are preferably slightly deeper than the intended depth of grain to be placed in them. and each tray is provided with hooks 51 which may be supported from the tray above it. The hooks of the uppermost tray are adapted to be fitted into cooperating hooks 52 mounted in the lower surface of the top 12, and the hooks 51 are preferably designed so that approximately one-half inch is left between the upper edge of one container and the lower surface of the tray just above it. Similarly, a space of from one to two inches is left between the upper edge of the uppermost trays 50 and the lower surface of the top 12.

An alternate method of securing access to the enclosure 25 is also indicated in Figure 5. This method is adapted to be used where it is thought that the removable attachment of the enclosure 25 to the top 12 is undesirable, and where the use of the slit 42 is likewise not wanted. In the method shown in Figure 5, the top 12 is provided with a removable center portion 55 to which the hooks 52 are attached so that when the center portion is removed, the trays 50 are removed with it. A recessed handle 56 may be provided for convenience in removing the center portion 55, and the latter is provided with rabbeted or angularly positioned edges as shown to provide an insect-tight fit between it and the top 12. While a top with the removable center portion may be used with the vertically suspended containers 15, its use with them or the horizontally suspended trays 50 is generally undesirable because of the greater cost of manufacture, and because the opening of the top provides a greater opportunity for insects to escape.

To use this device, the containers 15 or the trays 50 are filled with grain and are suspended from the top in the appropriate manner. Insects in the proper stage of development, either eggs or adults, are then introduced into the grain, and the enclosure 25 is closed by closing the slit 42, tightening the wing nuts 41, and attaching the jar 32 to the ring 33. By maintaining the breeding device at the proper temperature, the eggs will hatch and the resulting worms will burrow into the kernels of grain, or if adult insects are used in the initial infestation they will lay their eggs on the grain. As the quantity of insects within the enclosure 25 is increased, a certain percentage of these insects will fly downwardly into the jar 32 where they will be trapped. Most of them, however, will remain in the upper portion of the enclosure, where they may be dislodged by striking or shaking the flexible, free swinging walls 26 of the enclosure 25, or by jarring the frame 10. When this is done, the insects loosen their hold and drop into the jar 32. It is here that the flexibility feature of the fabric side walls is essential. My purpose cannot be effectively served by wire screening, either loosely or smoothly attached to a frame, or by fabric if it is so tightly stretched or attached as to destroy its flexibility. In the normal and preferred manner of operation, the rings and hooks at 34 and 35 are disconnected to give maximum free-swinging flexibility, and the fabric of the container or bag is then shaken as vigorously as possible. After the insects are collected in the jar 32 in this manner, the jar is loosened from ring 32, and it then is hit sharply to cause the moths or insects to settle to the bottom. Before they can start to crawl upwardly on the sides of the jar, the latter is removed and covered with a relatively fine mesh wire screen, and an empty jar is attached to ring 33.

If the moths are the desired product, they may be transferred from the jar to other containers for use however desired. If moth eggs are the desired product, the moths are kept in the jar in the proper quantities for optimum egg production; and under the proper temperature conditions, the moths will lay their eggs in the jar. These eggs may then be removed by inverting the jar and shaking the eggs out through the screen, approximately twenty mesh, which will permit the eggs to pass therethrough but will retain the moths in the jar. This operation should preferably be performed in the open air where the dust will be carried away by air movement and thus unobjectionably removed. In the meantime, additional moths have hatched and developed from the eggs in the grain, and these may be removed from the enclosure 25 in the manner previously described. This process may be continued for two or three months until the grain has been exhausted, at which time the container 15 or trays 50 may be removed and refilled with grain, and the entire process repeated.

From the foregoing description, it will be seen that it is necessary that a certain amount of circulation of air through the enclosure 25 be provided; and consequently the enclosure has been made of a porous material such as fabric through which a suitable amount of air may pass. It is also to be noted that the removal of the insects from the enclosure 25 requires that the latter be jarred or shaken; and, if the slit 42 is used, the material must be sufficiently flexible to permit it to be opened. For these reasons, the use of a flexible material such as cloth is much preferred over a relatively non-flexible material such as stiff wire screening, in the construction of the enclosure 25. Another advantage offered by this device is the self-cleaning feature. There can be no accumulation of dead moths or dust within the enclosure proper since the small amount of such debris produced by normal operations is daily or regularly removed with the jar.

It will thus be seen that a compact and very efficient insect breeding device has been provided which is simple in construction and operation. While a preferred and modified form has been shown, it is apparent that modifications may be made which in no way depart from the scope of the invention; and the latter is not to be limited

I claim:

1. A device for breeding insects which includes: a frame having legs and a top attached thereto; a plurality of removable food containers pendantly attached to the under surface of said top, each of said containers being independently attached thereto; a flexible porous enclosure removably attached to the under surface of said top to extend downwardly therefrom and surround said containers, said enclosure having a porosity such that air but not insects may pass therethrough; a removable trapping container pendantly supported by said enclosure at the lower end thereof, said enclosure having a main section surrounding but not touching said containers and a downward tapering section, continuous with the main section, and between the said main section and said trapping container; and releasable means attaching said enclosure to said legs at the lower end of said main portion, whereby the walls of said main portion of said enclosure are held substantially vertical.

2. A device for breeding insects which includes: a frame having legs and a top attached thereto; a plurality of removable food containers horizontally suspended from the under surface of said top, each container being removably attached to the container above it, and the upper container being removably attached to said top; a flexible porous enclosure removably attached to the under surface of said top to extend downwardly therefrom and surround said containers, said enclosure having a porosity such that air but not insects may pass therethrough; a removable trapping container pendantly supported by said enclosure at the lower end thereof, said enclosure having a main section surrounding but not touching said containers and a downward tapering section, continuous with the main section, and between the said main section and said trapping container; and releasable means attaching said enclosure to said legs at the lower end of said main portion, whereby the walls of said main portion of said enclosure are held substantially vertical.

3. A device for breeding insects which includes: a supporting frame including a top member, a removable food container pendantly supported by said top member, a flexible enclosure surrounding said food container and secured and sealed to said top member in a manner to hang in suspension therefrom, said enclosure permitting the passage of air but preventing the passage of moths, said flexible enclosure having a continuous side wall terminating at the lower end thereof in an insect exit channel, and a wide-mouth insect collection vessel detachably connectable in a pendent, insect-sealing relationship with the lower end of said side wall in uninterrupted communication with said exit channel, all in such manner that insects clinging to said enclosure side wall may be shaken free by movement of said hanging enclosure side wall and so caused to fall along said wall, through said channel, and thence into said vessel.

4. A device for breeding insects which includes: a supporting frame including a top member, a removable food container pendantly supported by said top member, a flexible enclosure surrounding said food container and secured and sealed to said top member in a manner to hang in suspension therefrom, said enclosure permitting the passage of air but preventing the passage of moths, said flexible enclosure having a continuous flexible side wall including a downwardly convergent lower section terminating in an insect exit opening, and a wide-mouth insect collection vessel detachably connectable in an insect-sealing relationship with the lower end of said downwardly convergent side wall section in uninterrupted communication with said insect exit opening, all in such manner that insects clinging to said enclosure side wall may be shaken free by movement of said hanging enclosure side wall and so fall along said wall, through said channel, and thence into said vessel.

5. A device as defined in claim 4, including also releasable spreader means engageable with said side wall near the upper portion of said downwardly convergent section.

6. A device for breeding insects which includes: a supporting frame including a top member, a removable food container pendantly supported by said top member, an enclosure surrounding said food container and secured and sealed to said top member in a manner to hang in suspension therefrom, said enclosure permitting the passage of air but preventing the passage of moths, said enclosure including a main flexible upper section capable of being shaken to dislodge insects clinging to the inside surface thereof and a downwardly convergent lower section whose walls are continuous with the upper section, and a wide-mouth insect collection vessel detachably connected with the lower end of said convergent section.

AUSTIN W. MORRILL.

REFERENCES CITED

The following references are of record in the file of this patent:

UNITED STATES PATENTS

| Number | Name | Date |
| --- | --- | --- |
| 228,666 | Moore | June 8, 1880 |
| 260,283 | Cook | June 27, 1882 |
| 404,565 | Schuyler | June 4, 1889 |
| 721,531 | Alston | Feb. 24, 1903 |
| 1,139,717 | Pipenhagen | May 18, 1915 |
| 1,318,652 | Farkas | Oct. 14, 1919 |
| 1,424,619 | Carlyle | Aug. 1, 1922 |
| 1,968,953 | Metzger | Aug. 7, 1934 |
| 1,974,549 | Spencer et al. | Sept. 25, 1934 |